(12) United States Patent  (10) Patent No.: US 8,949,774 B2
Makey et al.  (45) Date of Patent: Feb. 3, 2015

(54) GENERATED OBJECT MODEL FOR TEST AUTOMATION

(75) Inventors: Kristopher Makey, Kirkland, WA (US); Ryan Cavanaugh, Seattle, WA (US); Dmitri Klementiev, Redmond, WA (US); Xuechun Li, Redmond, WA (US); Scott Louvau, Redmond, WA (US); Eric Maino, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 141 days.

(21) Appl. No.: 13/225,580

(22) Filed: Sep. 6, 2011

(65) Prior Publication Data

US 2013/0061204 A1 Mar. 7, 2013

(51) Int. Cl.
 *G06F 9/44* (2006.01)
 *G06F 11/36* (2006.01)

(52) U.S. Cl.
 CPC ........ *G06F 11/3672* (2013.01); *G06F 11/3684* (2013.01); *G06F 8/35* (2013.01)
 USPC .......................................................... 717/104

(58) Field of Classification Search
 CPC .................................................. G06F 11/3684
 USPC ........................................................ 717/104
 See application file for complete search history.

(56) References Cited

U.S. PATENT DOCUMENTS

| | | | |
|---|---|---|---|
| 6,349,343 B1 | 2/2002 | Foody et al. | |
| 7,171,417 B2 | 1/2007 | Chen et al. | |
| 7,185,016 B1 | 2/2007 | Rasmussen | |
| 7,392,509 B2 | 6/2008 | Sinha et al. | |
| 7,480,898 B2 | 1/2009 | Batten et al. | |
| 7,546,309 B1 | 6/2009 | Michel et al. | |
| 7,725,873 B2 | 5/2010 | Shepard et al. | |
| 2005/0086022 A1 | 4/2005 | Lindberg et al. | |
| 2005/0187930 A1 | 8/2005 | Subramanian et al. | |
| 2005/0240794 A1 | 10/2005 | Sinha et al. | |
| 2005/0267976 A1 | 12/2005 | Chang et al. | |
| 2005/0268285 A1* | 12/2005 | Bagley et al. .................. | 717/124 |
| 2006/0010426 A1 | 1/2006 | Lewis et al. | |
| 2006/0075305 A1* | 4/2006 | Robinson et al. ............... | 714/38 |
| 2006/0101397 A1 | 5/2006 | Mercer et al. | |
| 2007/0220342 A1 | 9/2007 | Vieira et al. | |
| 2008/0016499 A1 | 1/2008 | Jones et al. | |
| 2008/0127101 A1 | 5/2008 | Anafi et al. | |
| 2008/0270992 A1 | 10/2008 | Georgieva et al. | |
| 2008/0270998 A1 | 10/2008 | Zambrana | |

(Continued)

OTHER PUBLICATIONS

IBM Technical Disclosure: "A Mechanism to Map Objects Between a Computational Independent Model and a Platform Specific Model"; various authors; IP.com website; May 20, 2009.*

(Continued)

*Primary Examiner* — Qing Chen
*Assistant Examiner* — Clint A Thatcher
(74) *Attorney, Agent, or Firm* — Kevin Sullivan; Kate Drakos; Micky Minhas

(57) ABSTRACT

A generated object model engine abstracts actions, used in test cases, in a manner to produce new object model types that are independent of an underlying code implementation. The generated object model engine analyzes action classes to aggregate a set of actions having similarly-related class types. Action classes having similarly-related class types are then used to form a new object model type. The new object model type may be used in a test case to hide the action's code implementation from the test case.

20 Claims, 6 Drawing Sheets

(56) References Cited

U.S. PATENT DOCUMENTS

| | | | |
|---|---|---|---|
| 2009/0006440 | A1 | 1/2009 | Tolskyakov et al. |
| 2009/0300585 | A1 | 12/2009 | Meenakshisundaram et al. |
| 2011/0258600 | A1* | 10/2011 | Osenkov et al. ............ 717/124 |
| 2011/0283148 | A1* | 11/2011 | Rossi ......................... 714/38.1 |

OTHER PUBLICATIONS

Padovani, et al., "A Generative Approach to the Implementation of Language Bindings for the Document Object Model", Retrieved at <<http://www.di.unito.it/~padovani/Papers/lncs_3286.pdf>>, Proceedings of 3rd International Conference on Generative Programming and Component Engineering, 2004, pp. 469-487.

Kuchten, Philippe B., "The 4+1 View Model of Architecture", Retrieved at <<http://ieeexplore.ieee.org/stamp/stamp.jsp?tp=&arnumber=469759>>, IEEE Software, vol. 12, No. 6, Nov. 1995, pp. 42-50.

Bottger, et al., "An Object-Oriented Model for Specification, Prototyping, Implementation and Reuse", Retrieved at <<http://ieeexplore.ieee.org/stamp.jsp?tp=&arnumber=655873>>, conference on Design, automation and test in Europe, Feb. 23-26, 1998, pp. 303-310.

Markovic, et al., "Object Model Unifying Wrapping, Replacement and Roled-Objects Techniques", Retrieved at <<http://www.mip.sdu.dk/~brj/library/related work/sochor-Roles.pdf>>, Workshop No. 9—Unanticipated Software Evolution (USE), Proceedings of 16th European Conference on Object-Oriented Programming (ECOOP)—University of Malaga, Spain, Jun. 2002, pp. 10.

"Non-Final Rejection Issued in U.S. Appl. No. 12/762,371", Mailed Date: Aug. 13, 2013, 28 Pages.

"Final Rejection Issued in U.S. Appl. No. 12/762,371", Mailed Date: Apr. 17, 2013, 25 Pages.

"Non-Final Rejection Issued in U.S. Appl. No. 12/762,371", Mailed Date: Dec. 7, 2012, 20 Pages.

"Notice of Allowance Issued in U.S. Appl. No. 12/762,371", Mailed Date: Dec. 30, 2013, 20 Pages.

Hangal, et al., "Tracking Down Software Bugs Using Automatic Anomaly Detection", In Proceedings of the 24th International Conference on Software Engineering, May 19, 2002, pp. 291-301.

Kropp, et al., "Automated Robustness Testing of Off-the-Shelf Software Components", In Proceedings of the Twenty-Eighth Annual International Symposium on Fault-Tolerant Computing, Jun. 23, 1998, 10 Pages.

Larsen, et al., "Testing Real-Time Embedded Software using UPPAAL-TRON", In Proceedings of the 5th ACM International Conference on Embedded Software, Sep. 2005, pp. 299-306.

Forrester, et al., "An Empirical Study of the Robustness of Windows NT Applications Using Random Testing", In Proceedings of the 4th Conference on USENIX Windows Systems Symposium, Aug. 3, 2000, pp. 59-68.

Muccini, et al., "Using Software Architecture for Code Testing", in IEEE Transactions on Software Engineering, vol. 30, Issue 3, Mar. 2004, pp. 160-171.

Godefroid, et al., "Automating Software Testing Using Program Analysis", In IEEE Software, vol. 25, Issue 5, Sep. 2008, pp. 30-37.

Dimitriadis, Dimitris, "DOM Test Suite Methodology Report", NIST GCR 04-860, A Report Prepared for U.S. Department of Commerce, Information Technology Laboratory, National Institute of Standards and Technology, Feb. 2004, 22 Pages.

"Using Domain Specific Languages", Retrieved at <<http://web.archive.org/web/20080804044112/http://martinfowler.com/dslwip/UsingDsls.html>>, Apr. 9, 2008, 12 Pages.

Li, Bei, "Layered Architecture for Test Automation", Retrieved at <<http://www.infoq.com/articles/layered-test-automatation>>, Aug. 11, 2009, 7 Pages.

Tolvanen, Juha-Pekka, "Domain-Specific Modeling: Making Code Generation Complete", Retrieved at <<http://www.devx.com/architect/Article/3135111954>>, Apr. 27, 2006, 11 Pages.

* cited by examiner

GENERATED OBJECT MODEL FOR TEST AUTOMATION

BACKGROUND

Software testing is a crucial part in the development of a software application. Software testing requires test cases that can discover program errors quickly and thoroughly. A comprehensive test case may take an enormous amount of time and expense to develop and maintain. Test cases may be written in a traditional general purpose programming language. These test cases are dependent on the code implementation which may be difficult and costly to maintain over time. Alternatively, domain specific languages, scripting languages, and declarative languages may be used to create test cases in a manner where the test cases are independent of the underlying software implementation. However, these languages may lack the broad programming constructs and capabilities needed to construct quality written test cases for certain types of applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An integrated development environment may include a generated object model engine having the capability to abstract programmable actions into an object model that is independent of an underlying code implementation. The generated object model engine analyzes the actions or operations used in a test case application to determine those that may be aggregated into a new object model type. The actions are analyzed with respect to object model generation rules that consider the characteristics of their class structure in order to group similarly-related actions into a new object model type. In an embodiment, the object model generation rules may be based on class types.

In an embodiment, the generated object model engine forms an object model from similarly-related action classes. An action class is a class having properties and constructors that take inputs. Action classes having a similarly-related class type may be aggregated to form a new object model type. The class types may be determined from runtime type resolution and from type detection rules that may consider type inheritance, namespaces, attributes, and/or function parameters associated with an action class. The final result of the generated object model may be a new object model type taking the form of an API that contains the aggregated set of actions. The new object model type exposes an abstract view of the aggregated actions to the test case while hiding the code implementation of the aggregated actions.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments are directed to a technology for aggregating programmable actions into an object model that is independent of the underlying code implementation. In an embodiment, the generated object model may be a collection of object model types for use in test case applications that are written in a general purpose programming language. The object model type may be implemented as an API. The code implementation of the object model is hidden from a test case application thereby enabling the action's code implementation to change without affecting the test case application. In this manner, the test cases are easier to maintain and update over time as updates and changes are made to the action's code implementation.

In one or more embodiments, the test cases may be developed and tested in an integrated development framework (IDE) that supports applications written in a variety of programming languages, including an object-oriented programming language. For test cases written in an object-oriented programming language, classes are the main structural component of a program. In one or more embodiments, the generated object model may be constructed for actions classes. However, the embodiments are not limited to this construction and the generated object model may be constructed for other types of data structures, such as without limitations, script commands, functions, and the like.

Action classes are classes whose properties and constructors have inputs. As such, the action classes are actions that a user would take in developing a software application. For example, CreateProject and OpenProject are well-known classes that enable a user to develop a software application. The CreateProject class may be used by a user to create a software application. The OpenProject class may be used by a user to open an existing software application. Action classes having a similar class type may be aggregated to form a new object model type. The class types may be determined from runtime type resolution and from type detection rules that may consider type inheritance, namespaces, attributes, and function parameters associated with an action class. The final result of the generated object model may be a new object model type taking the form of an API that contains the aggregated set of actions. The new object model type exposes an abstract view of the aggregated actions to the test case while hiding the code implementation associated with the aggregated actions.

Figure 1:
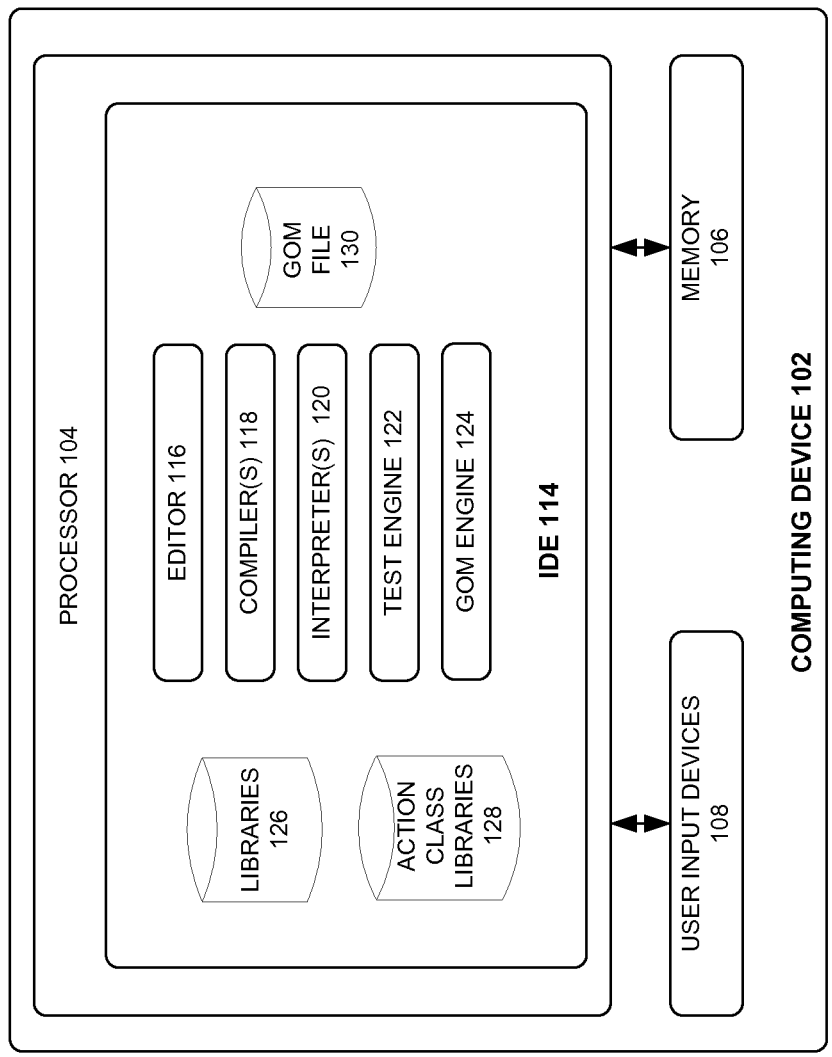
FIG. 1 illustrates a block diagram of an exemplary system for developing generated object models.
Figure 5:
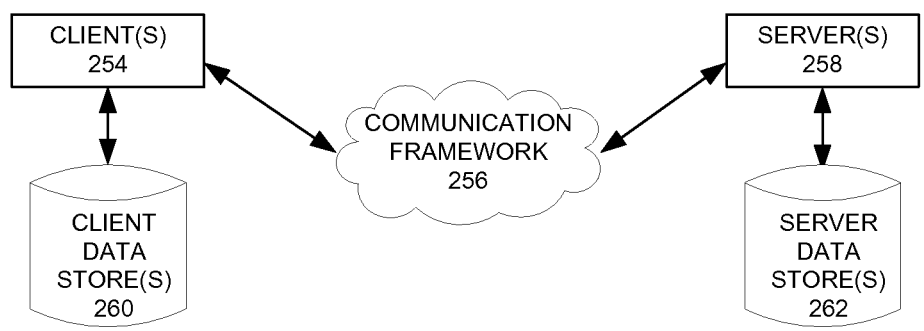
FIG. 5 is a block diagram illustrating an operating environment.

FIG. 1 illustrates an exemplary system 100 for creating a generated object model. Although the system 100 shown in FIG. 1 has a limited number of elements in a certain configuration, it should be appreciated that the system 100 can include more or less elements in alternate configurations. Some or all of the system 100 may be performed on any type of computing device 102, such as a computer (e.g., server, personal computer, notebook, tablet PC, laptop, etc.), a mobile computing device, a mobile phone, a personal digital assistant and so forth. The computing device 102 may comprise a processor 104, a memory 106, and user input devices 108 which are standard computing devices and may be described in further detail below with respect to FIG. 5.

The computing device 102 may include an integrated development environment (IDE) 114 that may be used as a test automation framework. The IDE 114 may be a software application that contains a set of resources and tools for use in developing and testing software applications, such as, without limitation, test cases. In one or more embodiments, the IDE may be Microsoft's Visual Studio®. However, the embodiments are not limited to Visual Studio® and other IDE's may embody the techniques described herein such as without limitation, Eclipse, NetBeans, etc.

The IDE 114 may include an editor 116, one or more compilers 118, one or more interpreters 120, a test engine 122, a generated object model (GOM) engine 124, one or more libraries 126, one or more action class libraries 128, and a GOM file 130. The editor 116 enables a user to write and edit software applications. The software applications may include source code created in one or more programming languages (e.g., Visual Basic, Visual J#, C++. C#, J#, Java Script, APL, COBOL, Pascal, Eiffel, Haskell, ML, Oberon, Perl, Python, Scheme, Smalltalk and the like), declarative languages (e.g., XML, XAML, script files, etc.) and the like. Each compiler 118 translates source code associated with a particular programming language into an intermediate language representation (i.e., managed code), machine code (i.e. native code) or the like. Each interpreter 120 executes a set of executable instructions (i.e., .exe file) to perform a task, such as execution of a test case. The test engine 122 may be a software component that executes a test case and in some cases may be implemented as an interpreter 120. The GOM engine 130 creates the generated object model which is described in more detail below.

The IDE 114 may include one or more libraries 126, one or more action class libraries 128, and a GOM file 130. The libraries 126 are a collection of programmable resources, such as APIs, classes, executable code, data structures, and so forth. The action class libraries 128 are a particular set of libraries that contain action classes. The GOM file 130 stores the generated object model which may be implemented as a code file or an assembly file (e.g., .NET assembly, managed code, API, binary file, etc.).

The system 100 may comprise a computer-implemented system having multiple components, programs, procedures, modules. As used herein these terms are intended to refer to a computer-related entity, comprising either hardware, a combination of hardware and software, or software. For example, an element shown in FIG. 1 may be implemented as a process running on a processor, a hard disk drive, multiple storage drives (of optical and/or magnetic storage medium), an object, an executable, a thread of execution, a program, and/or a computer. One or more elements may reside within a process and/or thread of execution, and an element may be localized on one computer and/or distributed between two or more computers as desired for a given implementation. The embodiments are not limited in this manner.

The various embodiments of the system 100 may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an embodiment is implemented using hardware elements and/or software elements may vary in accordance with any number of factors, such as desired computational rate, power levels, bandwidth, computing time, load balance, memory resources, data bus speeds and other design or performance constraints, as desired for a given implementation.

Attention now turns to a more detailed discussion of the operation of the system with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 2:
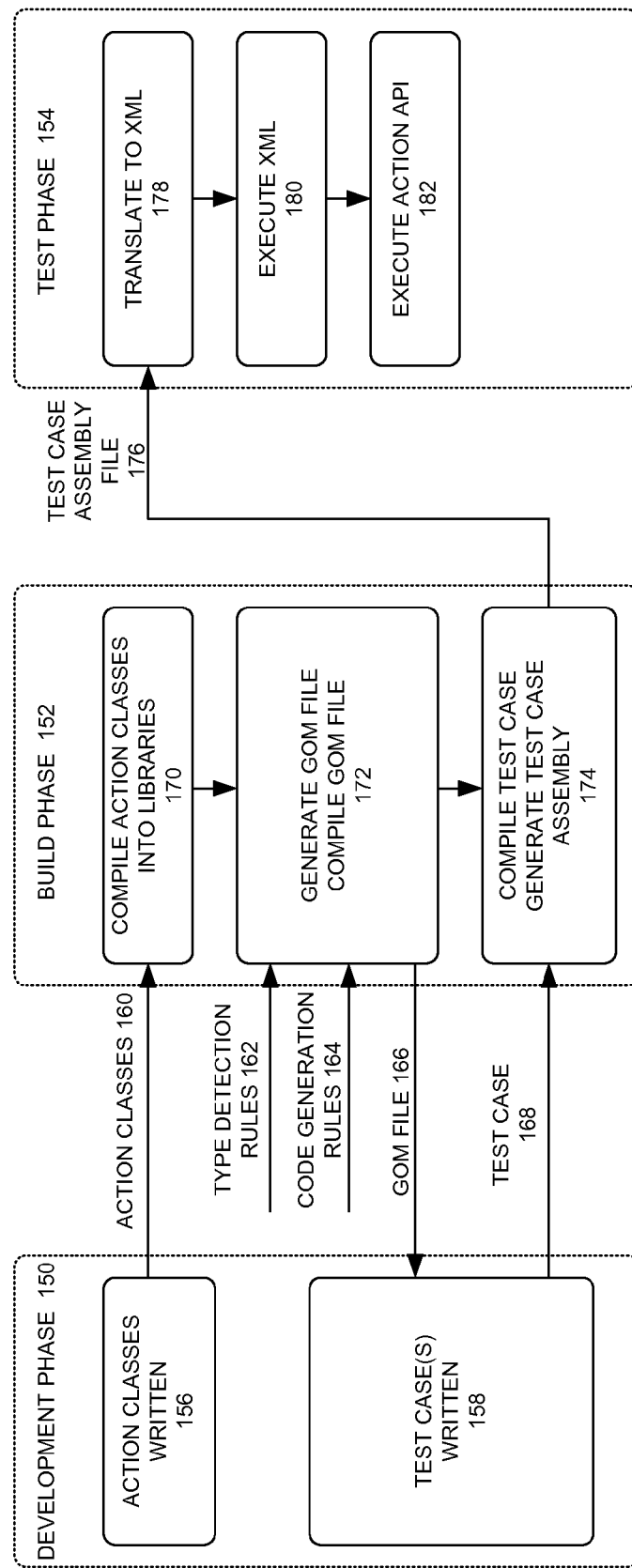
FIG. 2 illustrates a block diagram of exemplary phases in the development and use of a generated object model.

Turning to FIG. 2, there is shown an exemplary life cycle of the generated object model. In the development phase 150, the action classes are written or developed by a software developer or user of the IDE (block 156). In the build phase 152, the generated object model (GOM) is created using the action classes 160, a set of type generation rules 162, and code generation rules 164, and then compiled and stored in a GOM file 166 (block 172). The generated object model may be implemented as a set of APIs which may then be incorporated into one or more test cases 168 (block 158). A test case 168 may then be compiled (block 170) into a test case assembly file 176 (block 174). In the test phase 154, the test case assembly file 176 is executed. An API call contained in the test case assembly file 176 may be converted into a corresponding XML code (block 178) which is then executed (block 180). In particular, the XML code may instantiate the class implementing the API, create an instance of the class, or object, in memory, read in the parameters for the object from the test case and call the execute method on that class (block 182).

Figure 3:
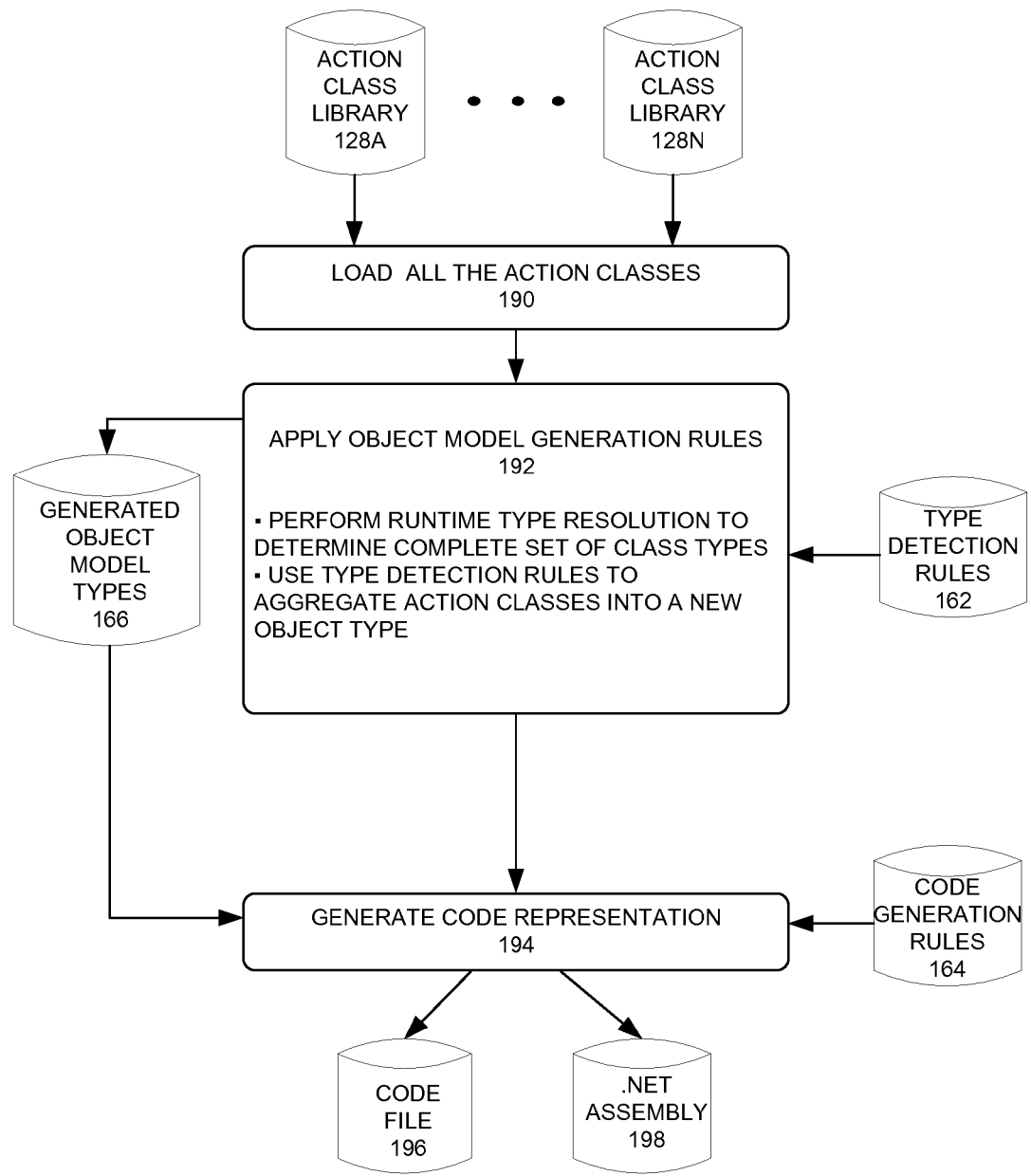
FIG. 3 illustrates a flow chart of an exemplary method for developing a generated object model.

Attention now turns to a more detailed description of the process for creating the generated object model. Referring to FIG. 3, the GOM engine 124 may analyze a variety of action classes 160. Initially, the GOM engine 124 proceeds by loading in all the available action classes (block 190). The action classes may be contained in a number of binary files stored in one or more action class libraries 128a-128n. The action classes may pertain to a diverse set of methods or actions that may be used in one or more test cases.

Next, the GOM engine 124 may apply the object generation rules to create new object model types (block 192). The object generation rules may be based on a set of rules that aggregates action classes based on similarly-related class types. The GOM engine 124 may first determine the class type of each action class. This may be accomplished through runtime type resolution. For example, in the .NET framework, the System.Reflection feature may be used to obtain information about an object at runtime. In particular, the names of the methods in the class, the type of the object, and so forth. The GOM engine 124 may utilize this feature to determine the class type of each action class (block 192).

Next, the GOM engine 124 may then aggregate the action classes based on a similar class type through type detection rules (block 192). The type detection rules may be specified by a developer of a test case. The type detection rules utilize the structural relationships between the classes to identify patterns indicative of a similarly-related class type. The type detection rules may consider type inheritance, namespaces, attributes, and function parameters associated with an action class. For example, the type detection rules may specify one or more of the following: classes having similar class names are related; child classes are similarly-related to their parent class; classes from the same namespace are similarly related; and classes having the same attribute tags. The GOM engine 124 aggregates the action classes in accordance with the type detection rules to generate a new object type for each set of aggregated classes (block 192).

The new object model type may then be transformed into program code using a set of code generation rules 164 (block 194). The code generation rules generate source code from the binary representation of the action class. For example, in the .NET framework, the code document object module (CodeDOM) may be used to generate source code representative of the new object model type. The new object model type may be stored as a code file 196 or compiled into a binary or assembly file 198 (e.g., .NET assembly file). The code file 196 may represent the new object model type in source code which may be embedded into another software application.

Figure 4B:
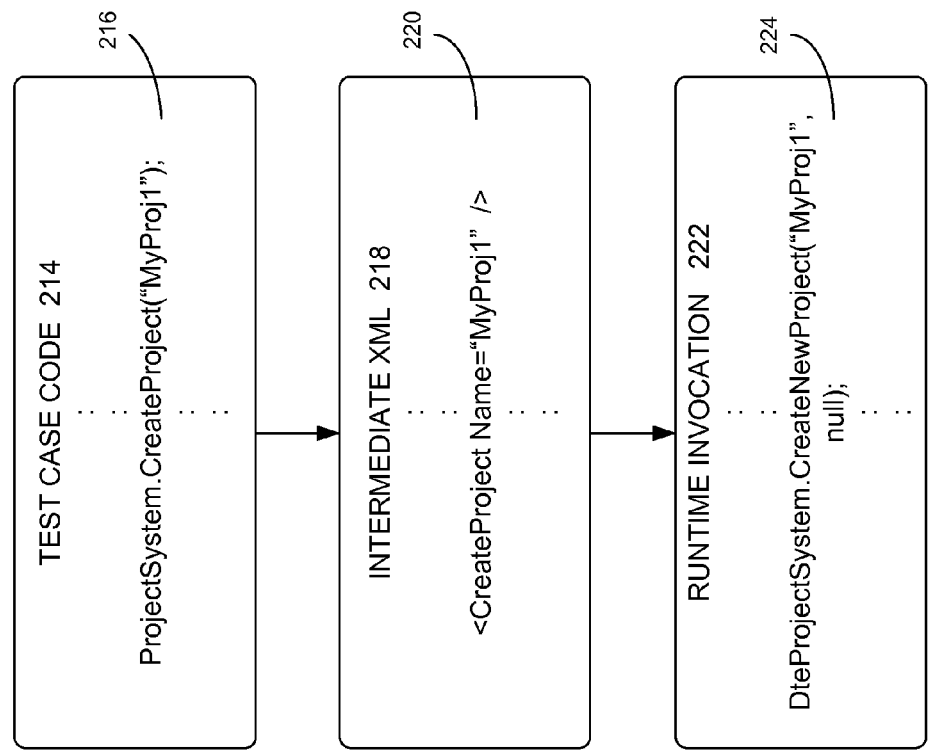
FIG. 4B is a second block diagram of exemplary code fragments illustrating the use of a generated object model.
Figure 4A:
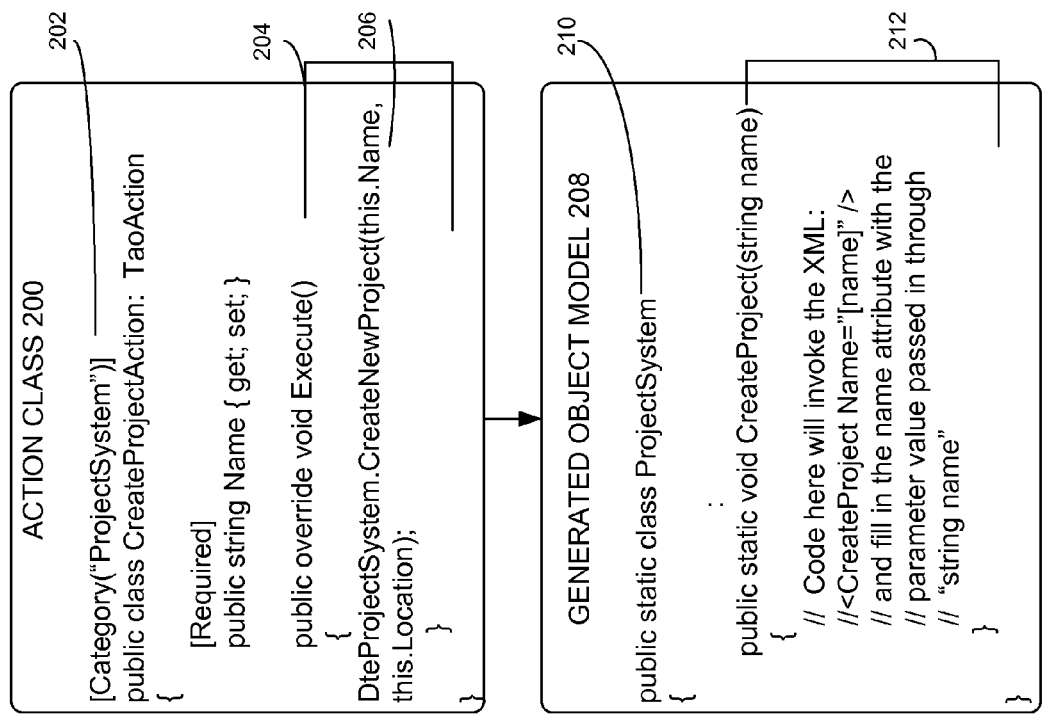
FIG. 4A is a block diagram of exemplary code fragments illustrating the development of a generated object model.

FIGS. 4A and 4B illustrate an example of a generated object model. FIG. 4A illustrates an action class 200 and a generated object model 208. The action class 200 is named "CreateProjectAction." The action class 200 is defined to be of the category "Project System" 202. The action class 200 contains a method 204 that calls the API, "DteProjectSystem.CreateNewProject (this.Name, this.Location)" 206.

The category name may be used by the GOM engine 124 to aggregate other action classes having the same category name into a generated object model 208 having the object model type "ProjectSystem." The generated object model 208 uses the method "ProjectSystem.CreateProject( )" 212 to activate the method 204 of action class 200 which in turns invokes the API, "DteProjectSystem.CreateNewProject."

FIG. 4B represents the use of the generated object model 208. A test case 214 may be written in a high-level programming language having multiple lines of source code. The test case 214 may invoke an instance of action class 200 through invocation of the object model type "ProjectSystem.CreateProject" with the input parameter "MyProj1." The invocation of "ProjectSystem.CreateProject" executes an intermediate command, such as the XML command 218, "CreateProjectName="MyProj1" 220. The XML command 218, in turn, generates the runtime invocation of the API of action class 222, which is "DteProjectSystem.CreateNewProject ("MyProj1", null)" 224. In this manner, the test case 214 is not dependent on the code implementation of the API "DteProjectSystem.CreateNewProject( )". As changes are made to the code implementation, the test case is not affected.

Attention now turns to a discussion of an exemplary operating environment. It should be noted that the operating environment 250 is exemplary and is not intended to suggest any limitation as to the functionality of the embodiments. The embodiments may be applied to an operating environment 250 having one or more client(s) 254 in communication through a communications framework 256 with one or more server(s) 258. The operating environment 250 may be configured in a network environment or distributed environment having remote or local storage devices. Additionally, the operating environment 250 may be configured as a stand-alone computing device having access to remote or local storage devices.

Each client(s) 254 is coupled to one or more client data store(s) 260 that store information local to the client 254. Each server(s) 258 is coupled to one or more server data store(s) 262 that store information local to the server 258. A client 254 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A client 254 may also be embodied as a software module having instructions that execute in a single execution path, multiple concurrent execution paths (e.g., thread, process, etc.), or in any other manner.

A server 258 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A server 258 may also be embodied as a software module having instructions that execute in a single execution path, multiple concurrent execution paths (e.g., thread, process, etc.), or in any other manner.

The communications framework 256 facilitates communications between the client 254 and the server 258. In an embodiment, the communications framework 256 may be embodied as a communications network, such as the Internet, a local area network, or a wide area network, or combinations thereof. The communications framework 256 may embody any type of communications medium, such as wired or wireless networks, utilizing any communication protocol.

Figure 6:
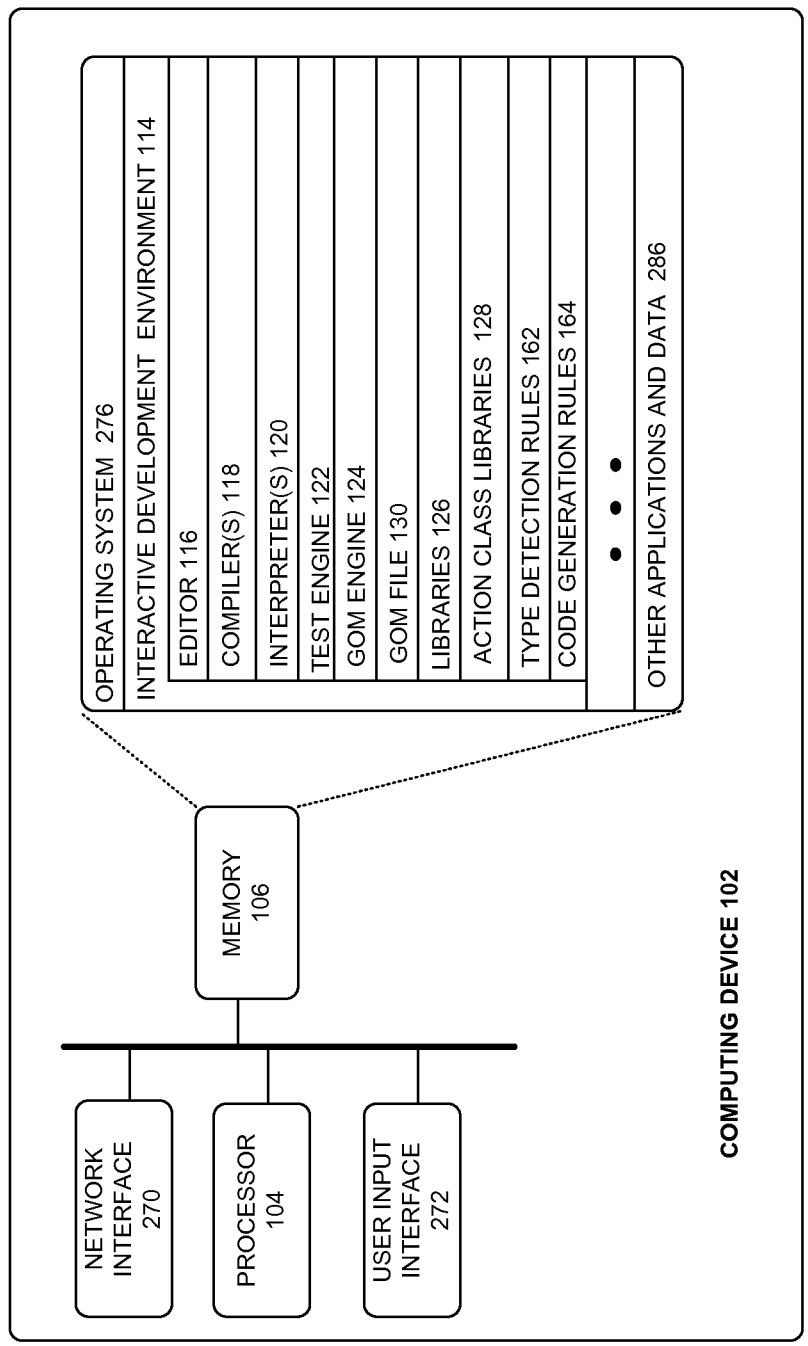
FIG. 6 is a block diagram illustrating exemplary components of a computing device used in an operating environment.

FIG. 6 illustrates an operating environment configured as a computing device 102. The computing device 102 may have a network interface 270, a processor 104, a user input interface 272, and a memory 106. The processor 104 may be any commercially available processor and may include dual microprocessors and multi-processor architectures. The network interface 270 facilitates wired or wireless communications between the computing device 102 and a communications framework 256.

The memory 106 may be any computer-readable storage media or computer-readable media that may store processor-executable instructions, procedures, applications, and data. The computer-readable media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy drive, disk drive, flash memory, and the like. The memory 106 may also include one or more external storage devices or remotely located storage devices. The memory 106 may contain instructions and data as follows:

an operating system 276;
an interactive development environment 114 having
an editor 116;
one or more compilers 118;
one or more interpreters 120;
a test engine 122;
a GOM engine 124;
libraries 126;
action class libraries 128;
type detection rules 162; and
code generation rules 164; and various other applications and data 286.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the embodiments have been illustrated with respect to test automation applications, the embodiments are not limited to any particular type of application or interactive development environment. In addition, the embodiments have been described with respect to abstracting logical actions implemented as action classes. However, the embodiments are not limited to action classes and the technology described herein may be applied to other programming constructs, such as without limitation, function calls, script commands, and the like.

What is claimed:

1. A computer-implemented method, comprising:
    providing one or more test case applications written in an object-oriented programming language, the one or more test case applications including one or more action classes;
    dynamically determining a class type associated with each of the action classes;
    aggregating the action classes into one or more sets, each set including one or more of the action classes having similarly-related class types; and
    generating an object model type for each.

2. The computer-implemented method of claim 1, further comprising:
    producing a code implementation for the object model type.

3. The computer-implemented method of claim 1, further comprising:
    developing an application using the object model type.

4. The computer-implemented method of claim 1, wherein each action class has one or more properties or constructors that take input.

5. The computer-implemented method of claim 1, the dynamically determining step further comprises:
    performing runtime type resolution for each action class to determine the class type.

6. The computer-implemented method of claim 1, wherein the similarly-related class types is based on one or more of type inheritance, namespaces, attributes, or function parameters.

7. The computer-implemented method of claim 1, wherein the similarly-related class types are determined using type detection rules.

8. The computer-implemented method of claim 1, wherein the similarly-related class type is based on one or more of a namespace, a name of a method of an action class, a similar action class name, or attribute tag.

9. The computer-implemented method of claim 1, wherein the method is performed in an integrated development environment.

10. The computer-implemented method of claim 1, further comprising:
    generating an application programming interface representing the new object type.

11. A computer-readable storage medium storing thereon processor-executable instructions that when executed on a processor perform the actions of:
    dynamically determining a class type associated with each action class used in one or more test case applications;
    aggregating a plurality of action classes to form a set of actions having a similarly-related class type;
    creating an object model type that represents the set of actions; and
    developing an application operable with one or more of the object model types.

12. The computer-readable storage medium of claim 11, further comprising:
    translating operations of the application implemented with the object model types to interface with operations performed with a second application.

13. The computer-readable storage medium of claim 11, wherein each object model type is implemented as an application programming interface.

14. The computer-readable storage medium of claim 11, further comprising:
    performing runtime type resolution to determine a class type associated with each action class.

15. The computer-readable storage medium of claim 11, further comprising:
    analyzing characteristics associated with each action class to aggregate similarly-related action classes.

16. A system, comprising:
    a processor; and
    a memory, coupled to the processor, the memory having a generated object model engine, the generated object model engine containing instructions that when executed on the processor generates an object model type associated with one or more action classes, the object model type providing an interface to a code implementation associated with the action class,
    dynamically determines a class type associated with each of the action classes;
    aggregates a plurality of action classes for association with the object model type based on a similarly-related class type, the action classes used in one or more test case applications.

17. The system of claim 16, wherein the similarly-related class type is based on one or more of type inheritance, namespaces, attributes, or function parameters.

18. The system of claim 16, wherein the generated object model engine performs runtime type resolution to determine the class type associated with each of the action classes.

19. The system of claim 16, wherein the generated object model engine aggregates the plurality of actions based on type detection rules.

20. The system of claim 16, wherein the generated object model engine generates a code representation for the object model type for use by a software application.

* * * * *